(12) United States Patent
Mori

(10) Patent No.: US 8,439,380 B2
(45) Date of Patent: May 14, 2013

(54) FRONT STRUCTURE OF SADDLE TYPE VEHICLE

(75) Inventor: Yotaro Mori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 17 days.

(21) Appl. No.: 13/053,876

(22) Filed: Mar. 22, 2011

(65) Prior Publication Data

US 2011/0309598 A1 Dec. 22, 2011

(30) Foreign Application Priority Data

Mar. 24, 2010 (JP) .................... 2010-068513

(51) Int. Cl.
*B62K 21/08* (2006.01)
*B61K 25/08* (2006.01)

(52) U.S. Cl.
USPC ........................................... 280/271

(58) Field of Classification Search ............ 280/276, 280/272, 271, 279, 89.11, 90, 89; 74/495
See application file for complete search history.

(56) References Cited

U.S. PATENT DOCUMENTS

| 340,109 | A | * | 4/1886 | Gibbons | 280/271 |
|---|---|---|---|---|---|
| 577,749 | A | * | 2/1897 | Hayes | 280/271 |
| 615,961 | A | * | 12/1898 | Doyle | 280/272 |
| 2,087,535 | A | * | 7/1937 | Dall | 280/272 |
| 4,006,915 | A | * | 2/1977 | Parker | 280/271 |
| 4,558,878 | A | * | 12/1985 | Motrenec | 280/272 |
| 5,022,671 | A | * | 6/1991 | Jones, Jr. | 280/250 |
| 2005/0151341 | A1 | * | 7/2005 | Iwamoto et al. | 280/272 |
| 2007/0095624 | A1 | * | 5/2007 | Ito | 188/314 |
| 2007/0176392 | A1 | * | 8/2007 | Schiffer et al. | 280/272 |
| 2009/0058039 | A1 | * | 3/2009 | Mickelson | 280/276 |

FOREIGN PATENT DOCUMENTS

| DE | 199 55 645 A1 | 5/2001 |
|---|---|---|
| FR | 2819778 | * 7/2002 |
| JP | 2009-113679 A | 5/2009 |

* cited by examiner

*Primary Examiner* — Anne Marie M Boehler
(74) *Attorney, Agent, or Firm* — Westerman, Hattori, Daniels & Adrian, LLP

(57) ABSTRACT

A front structure of a saddle type vehicle is provided with the added function of damping vibrations generated in the direction different from the direction of an axis of a telescopic fork, in addition to functioning as a steering damper. An automatic two-wheeled vehicle includes a head pipe provided on a front portion of a vehicle body frame, a steering stem supported by the head pipe, and a fork member coupled to the steering stem and supporting a front wheel. The fork member includes an upper pipe coupled to the steering stem, and a bottom pipe slidably coupled to the upper pipe and rotatably supporting the front wheel at a lower portion thereof. A damper member is provided between the bottom pipe and the vehicle body frame.

8 Claims, 15 Drawing Sheets

FRONT STRUCTURE OF SADDLE TYPE VEHICLE

TECHNICAL FIELD

The present invention relates to an improved front structure of a saddle type vehicle.

BACKGROUND OF THE INVENTION

A front structure of a saddle type vehicle having a steering damper disposed between a fork member which supports a front wheel and a vehicle body frame is known (for example, see JP-A-2009-113679 (FIG. 3)).

In FIG. 3 in JP-A-2009-113679, a steering damper is provided between a bottom bridge which supports a fork member and a vehicle body frame via a link mechanism. In this structure, when the front wheel is steered, vibrations and an impact applied to the front wheel are absorbed by the steering damper, so that preferable steering properties are secured.

However, the steering damper of JP-A-2009-113679 only has a damper mechanism for the steering. For example, it is preferable if a function to damp vibrations generated in the direction different from the direction of an axis of a telescopic fork can be added in addition to a function as a steering damper.

SUMMARY OF THE INVENTION

A front structure of a saddle type vehicle is provided with the added function of damping vibrations generated in the direction different from the direction of an axis of a telescopic fork, in addition to functioning as a steering damper.

A front structure of a saddle type vehicle includes: a head pipe provided on a front portion of a vehicle body frame; a steering stem rotatably supported by the head pipe; and a fork member coupled to the steering stem and supporting a front wheel, the fork member including a pair of left and right upper pipes coupled to the steering stem and a pair of left and right bottom pipes slidably coupled to the upper pipes and rotatably supporting the front wheel at a lower portion thereof, characterized in that a damper member for damping vibrations of the bottom pipes is provided between the bottom pipes and the vehicle body frame.

A bridge portion bridges the left and right bottom pipes, and a front portion of the damper member is coupled to a center portion of the bridge portion in the vehicle width direction, and a rear portion of the damper member is coupled to a center portion of the vehicle body frame in the vehicle width direction.

The front portion of the damper member passes through a centerline in the vehicle width direction, and is coupled to the bridge portion at a position offset from a centerline of the steering stem, in either a forward or rearward direction of the vehicle.

A center axis of the fork member and a center axis of the damper member are orthogonalized when the fork member is fully expanded.

The damper member includes a piston, a first rod extending from one surface of the piston, a second rod extending from the other surface of the piston, a cylinder member housing the first rod, the second rod and the piston, and a joint portion extending from the cylinder member coaxially with the first rod and the second rod, and coupled to a stay portion.

A front structure of a saddle type vehicle includes: a head pipe provided on a front portion of a vehicle body frame; a steering stem rotatably supported by the head pipe, at least one arm pivotably and forwardly extending from the front portion of the vehicle body frame; and a fork member provided at a front end of the arm and coupled to the steering stem so as to be steerable and pivotable, characterized in that a damper member is provided between the vehicle body frame and the fork member.

The damper member is provided between the bottom pipe of the telescopic fork and the vehicle body frame, or between a member attached to the bottom pipe and the vehicle body frame. When a force in the direction different from the direction of the axis of the telescopic fork is applied to the telescopic fork, the damper member makes a stroke and gently absorbs the force. Therefore, the vibrations applied to the directions different from the direction of the longitudinal axis, that is, the direction of strokes of the telescopic fork can be damped.

Since the vibrations applied in the directions different from the direction of the longitudinal axis of the telescopic fork can be damped, the vibrations generated in the telescopic fork are reduced, so that the riding comfort of the vehicle is improved.

In addition, the vibrations can be reduced by providing the damper member between the vehicle body frame and the member on the side of the bottom pipe, so that adjustment of the rigidity of the fork member is no longer necessary. Since the adjustment of the fork member is not necessary, increase in weight of the fork member can be restrained. In addition, since the damper member is configured to be expanded and contracted with respect to the bottom pipes at the time of steering, preferable damping forces according to the steering angle can be set.

The coupled portion at the front portion and the rear portion of the damper member are both at center positions in the vehicle width direction.

Assuming that at least one of the front portion and the rear portion of the damper member is coupled in a state being offset from the center in the vehicle width direction, the damper properties at the time of steering leftward are different from the damper properties at the time of steering rightward.

Regarding this point, since the front portion and the rear portion of the damper member are both coupled to the center position in the vehicle width direction, the damper properties at the time of steering leftward and the damper properties at the time of steering rightward can be set equally. Therefore, a preferable steering feeling with secured lateral balance can be obtained.

The front portion of the damper member is coupled at a position offset from the centerline of the steering stem rearward of the vehicle.

By coupling the front end of the damper to the center in the vehicle width direction at a position offset from a steering shaft forward or rearward, the distance between the vehicle body and the front end of the damper can be changed according to the operation of the steering. Therefore, the single damper can function as a steering damper, in addition to functioning to damping the vibrations in the fore-and-aft and left-and-right directions of the fork member.

The axis of the fork member and the axis of the damper member are positioned so as to be orthogonalized when the fork member is fully expanded. In this arrangement, the damping force of the damper member can be enhanced as the fork member contracts from the state in which the fork member and the damper member are orthogonalized. For example, by the orthogonal relationship of the axis of the fork member and the axis of the damper member at a position where the fork member is contracted in a state in which a driver is on the vehicle, the damping force is small in a range of small strokes, so that the good riding comfort is achieved, while a large damping force can be generated in the range of large strokes. Also, for example, by configuration such that the axis of the fork member and the axis of the damper member are orthogonalized in a state in which the fork member is completely expanded, the stroke of the damper member increases as the fork member approaches a completely bent state, so that the damping force of the damper member can be enhanced The joint portion is provided on the damper member and coupled to the stay portion on the side of the vehicle body frame, and the joint portion extends coaxially with the first rod and the second rod. With the stay portion extending along the axis of the damper member instead of the stay member extending at a right angle with respect to the axis of the damper member, the weight balance when the damper member is mounted on the vehicle is equalized in the vehicle width direction, so that the laterally equalized feeling of operation can be provided during steering.

The damper member is provided between the vehicle body frame and the fork member. In this arrangement, the vibrations applied on the fork member in the direction different from the direction of the axis of the steering stem can be damped with the damper member. Therefore, the vibrations of the fork member can be restrained.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
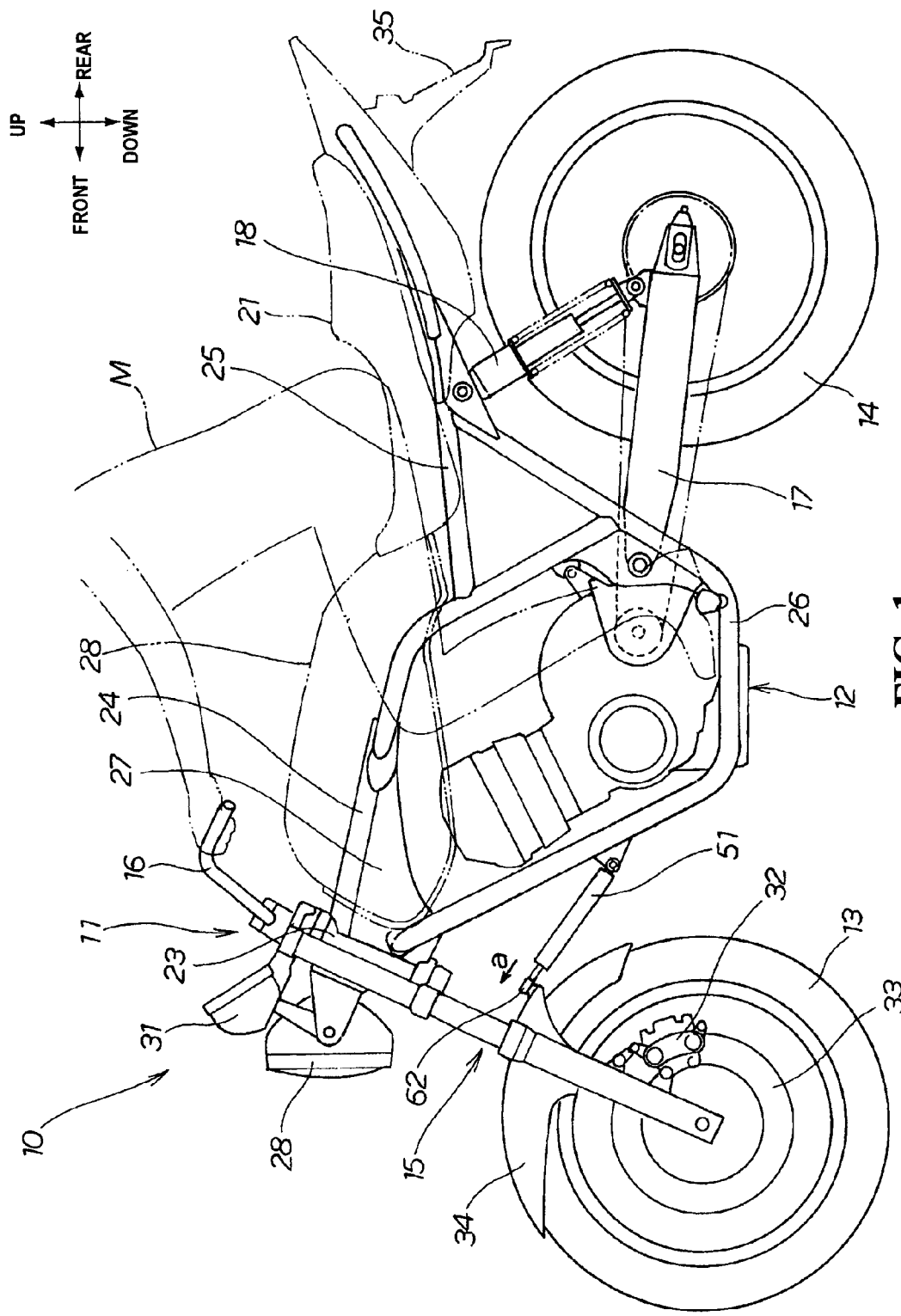
FIG. 1 is a left side view of an automatic two-wheeled vehicle.

A detailed description of embodiments of the present invention will be given below. In the drawings and the embodiments, "up", "down", "front", "rear", "left", and "right" indicate directions viewed from a driver who is riding on an automatic two-wheeled vehicle, respectively. The drawings are to be viewed in the orientation in which the reference numerals are viewed in the right way.

First Embodiment

Referring now to the drawings, a first embodiment will be described.

As shown in FIG. 1, an automatic two-wheeled vehicle 10 includes a vehicle body frame 11, an engine 12 as a drive source to be suspended from the vehicle body frame 11, a fork member 15 provided at a front portion of a vehicle and configured to support a front wheel 13 steerably and elastically, a steering handle 16 mounted on an upper portion of the fork member 15 for allowing the rider to perform a steering operation, a swing arm 17 provided on a rear portion of the vehicle and configured to pivotably support a rear wheel 14 driven by the engine 12, a cushion unit 18 configured to be interposed between the swing arm 17 and the vehicle body frame 11, and a rider's seat 21 provided between the front wheel 13 and the rear wheel 14 for allowing the rider to be seated thereon. Since the rider get on the vehicle astride the rider's seat 21, the vehicle of this type is referred to as a saddle type vehicle.

The vehicle body frame 11 includes a head pipe 23, a main frame 24 extending from the head pipe 23 rearward of the vehicle, a seat rail 25 extending rearward of the vehicle from a rear portion of the main frame 24 for mounting the rider's seat 21, and an under frame 26 arranged so as to surround the engine 12 in side view by extending obliquely rearward of the vehicle from the head pipe 23, then extending rearward of the vehicle, extending obliquely rearward and upward of the vehicle, joined with the main frame 24, extending further obliquely rearward and upward of the vehicle, and coupled to the seat rail 25. A plate-shaped reinforcing member 27 is bridged across a front portion of the main frame 24, the head pipe 23, and the under frame 26.

A vehicle body frame includes the vehicle body frame and components fixed to the vehicle body frame such as an engine.

A fuel tank 28 is arranged forward of the rider's seat 21 astride the main frame 24, and a head light 28 and instruments 31 are provided forward of the upper portion of the fork member 15. A brake caliper 32 is provided on a lower portion of the fork member 15, and a brake disk 33 configured to be clamped by the brake caliper 32 is arranged on the front wheel 13. Reference numeral 34 designates a front fender and reference numeral 35 designates a rear fender.

Figure 2:
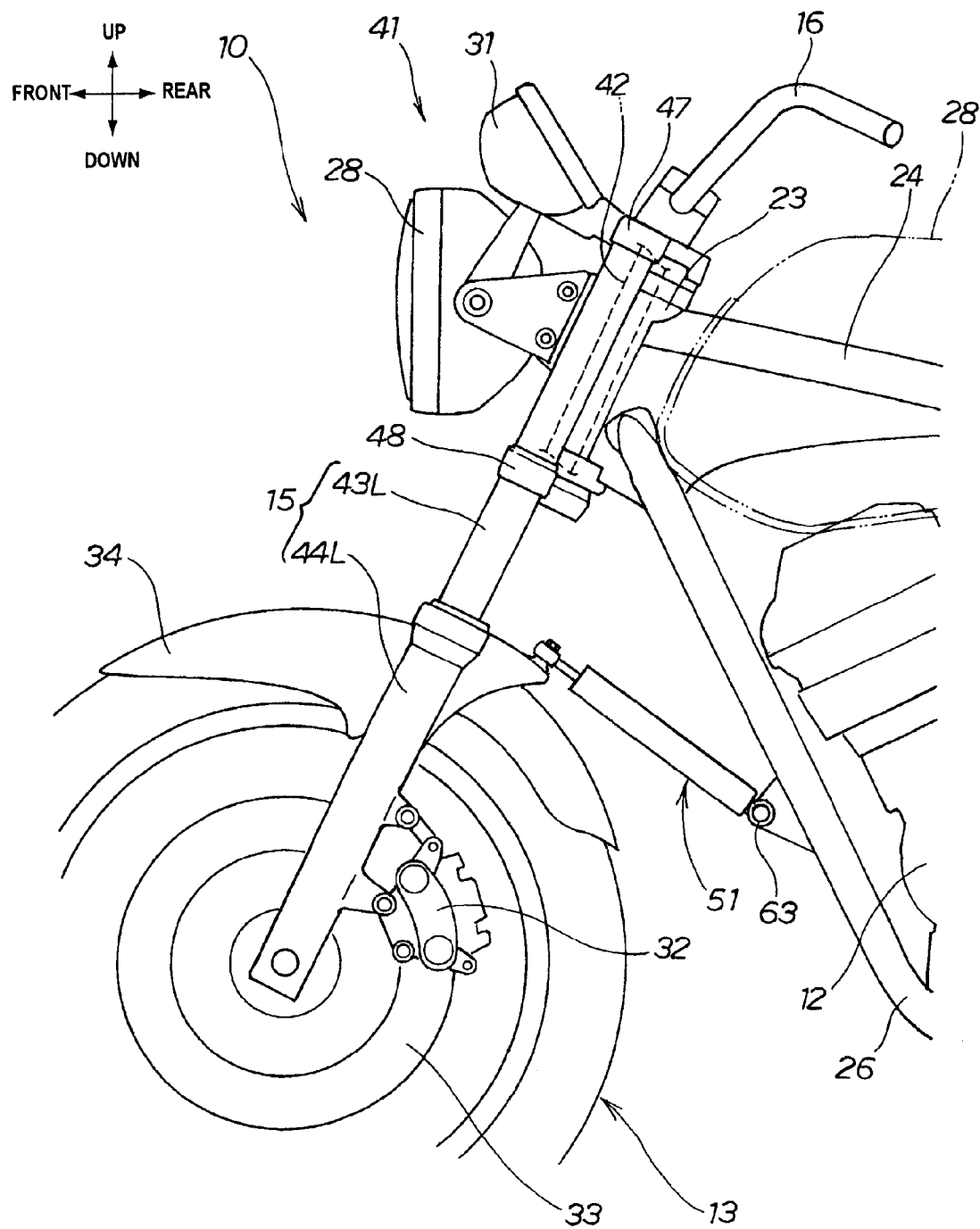
FIG. 2 is a left side view of a principal portion of the automatic two-wheeled vehicle.

As shown in FIG. 2, a front portion 41 of the automatic two-wheeled vehicle includes a steering stem 42 rotatably supported by the head pipe 23 and the fork member 15 coupled to the steering stem 42 and supporting the front wheel 13.

The fork member 15 is provided with a pair of left and right upper pipes 43L, 43R coupled to the steering stem 42 (only reference numeral 43L on the near side of the drawing is shown, hereinafter), and a pair of left and right bottom pipes 44L, 44R (only the reference numeral 44L on the near side of the drawing is shown, hereinafter) slidably coupled to the upper pipes 43L, 43R and rotatably supporting the front wheel 13 on the lower portion thereof.

More specifically, the pair of left and right upper pipes 43L, 43R are coupled to the steering stem 42 inserted into the head pipe 23 with a top bridge 47 and a bottom bridge 48 provided respectively on an upper end portion and a lower end portion of the steering stem 42, and the pair of left and right bottom pipes 44L, 44R extend so as to be slidable downward from lower end portions of the upper pipes 43L, 43R. In this embodiment, the bottom pipes 44L, 44R correspond to outer tubes, and the upper pipes 43L, 43R correspond to inner tubes, and springs are arranged on the outer tubes.

A damper member 51 for damping vibrations of the bottom pipes 44L, 44R is provided between the bottom pipes 44L, 44R and the vehicle body frame 11 separately from the fork member 15.

In this embodiment, the damper member is interposed between bottom pipes and the vehicle body frame. However, the invention is not limited thereto, and may be arranged between another member attached to the bottom pipe and the vehicle body frame without problem.

Figure 3:
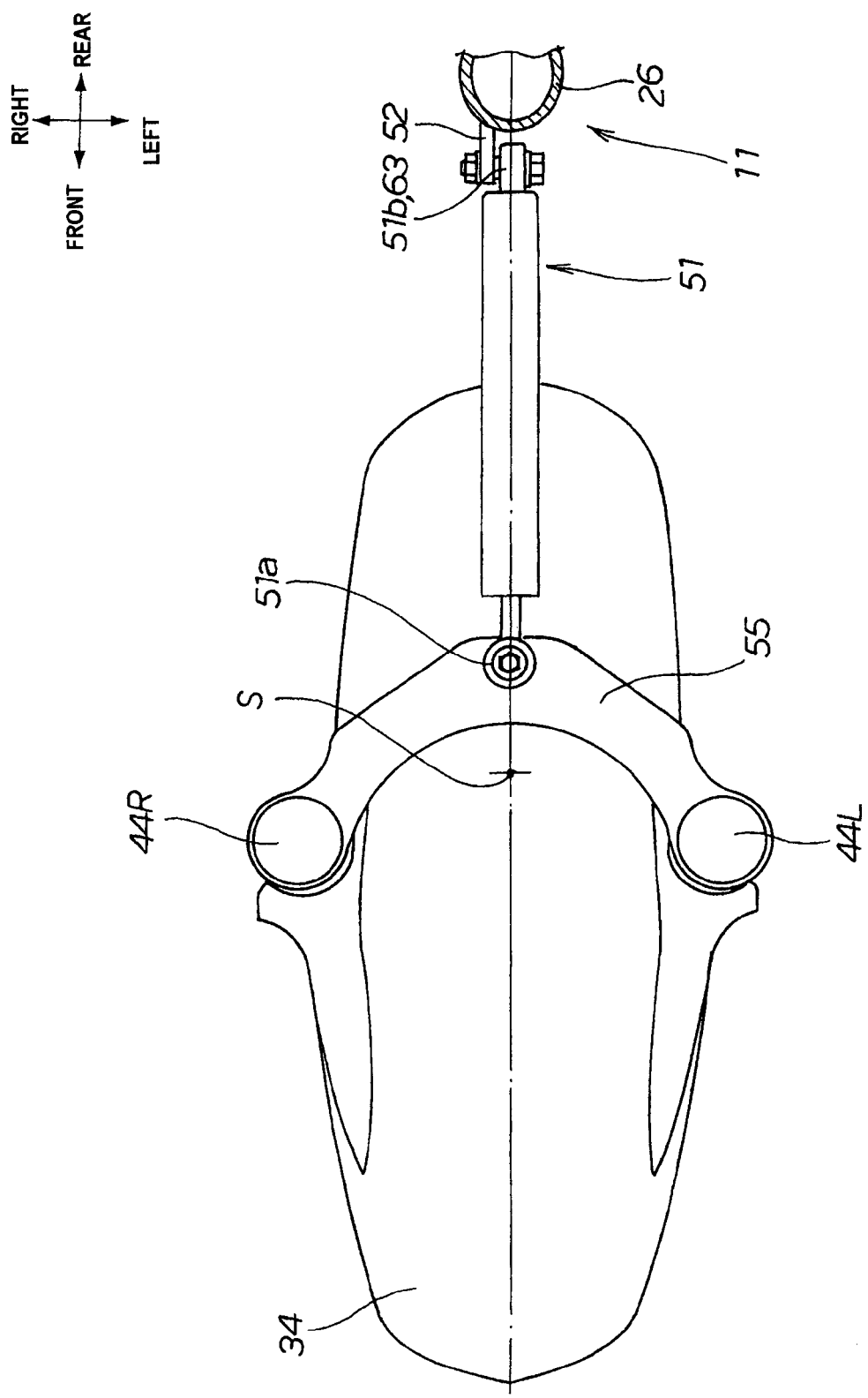
FIG. 3 is a drawing for explaining a mounting relationship of a damper member viewed in the direction of an axis of a fork member.

As shown in FIG. 3, a stay portion 52 is attached to the under frame 26 as a component of the vehicle body frame 11, a rear end portion 51b of the damper member 51 is coupled to the stay portion 52, the damper member 51 extends forward of the vehicle from the stay portion 52, and a front end portion 51a of the damper member 51 is coupled to a center portion in the vehicle width direction of a bridge portion 55 bridged between the left and right bottom pipes 44L, 44R. Here, the stay portion 52 is positioned at a center of the vehicle body frame 11 in the vehicle width direction.

The front end portion 51a of the damper member 51 is arranged at the center in the vehicle width direction, but is coupled to the bridge portion 55 at a position offset from a centerline S of the steering stem rearward of the vehicle.

Figure 4:
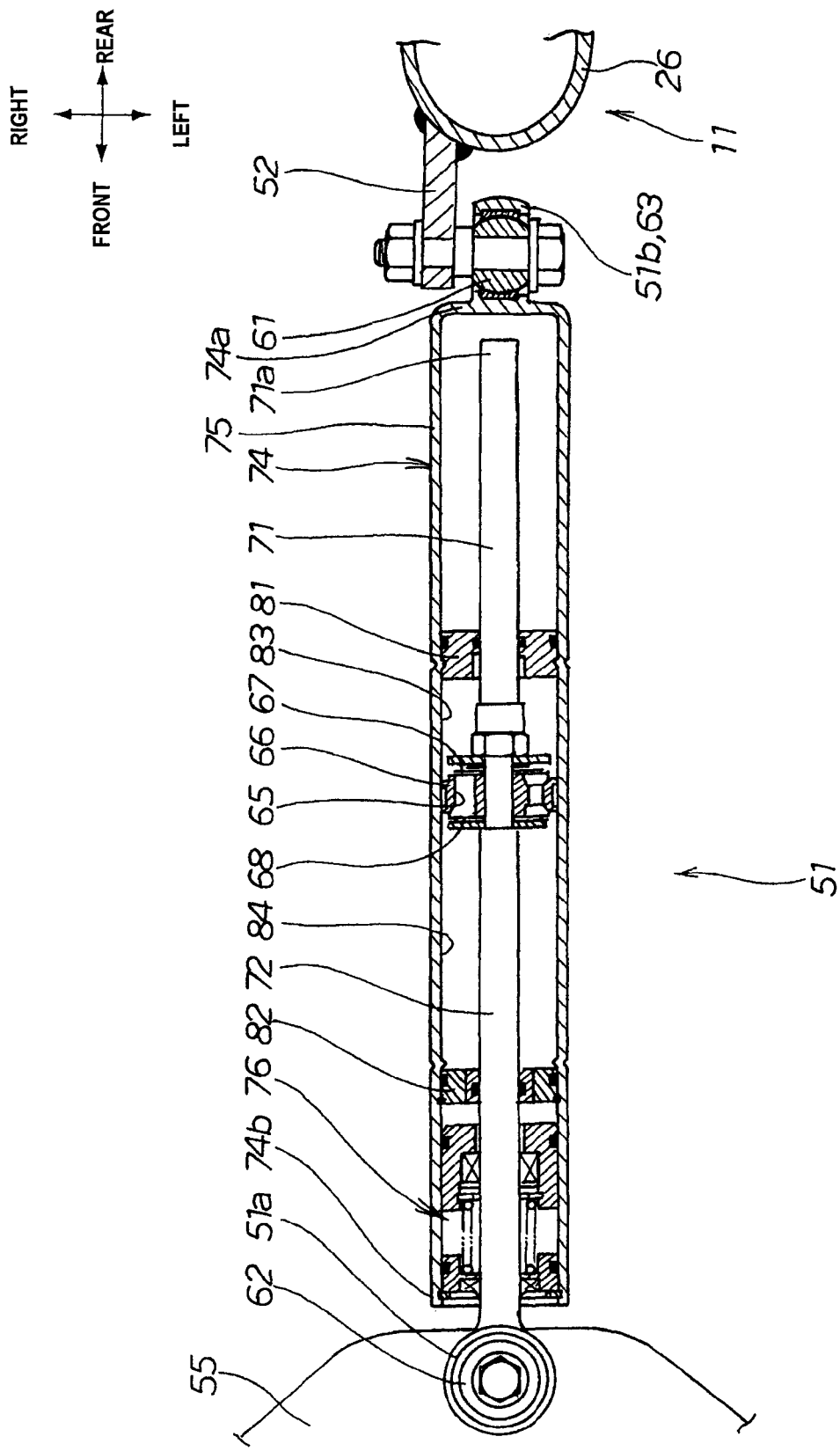
FIG. 4 is a cross-sectional view of the damper member.

As shown in FIG. 4, the damper member 51 extends to the stay portion 52 via a spherical bearing 61 so as to be pivotable to the left and right in the vehicle width direction (the vertical direction in the drawing) and so as to be pivotable in the vertical direction (in the direction of both sides of a sheet of the drawing), and the front end portion 51a of the damper member is attached to the joint portion 62 provided on the bridge portion 55 rotatably to the left and right in the vehicle width direction (the vertical direction in the drawing).

The damper member 51 includes a piston 66 provided with a plurality of orifices 65 as oil channels in the axial direction, a first rod 71 extending from one surface 67 of the piston 66, a second rod 72 extending from the other surface 68 of the piston 66, a cylinder member 74 having a cup portion 75 movably accommodating the piston 66 therein, a joint portion 63 extending from the one end 74a of the cylinder member 74 coaxially with the first rod 71 and the second rod 72, and coupled to the stay portion 52 provided on the side of the vehicle body frame 11, the joint portion 62, extending from the other end 74b of the cylinder member 74 coaxially with the first rod 71 and the second rod 72 and coupled to the bridge portion 55, a temperature compensating mechanism 76 formed on the side of the other end 74b of the cylinder member 74, a second partitioning wall 82 arranged apart from the temperature compensating mechanism 76 and partitioning the cylinder member 74, and a first partitioning wall 81 arranged on the opposite side of the piston 66 from the second partitioning wall 82 and partitioning the cylinder member 74. In this configuration, a first oil chamber 83 is defined between the piston 66 and the first partitioning wall 81, and a second oil chamber 84 is defined between the piston 66 and the second partitioning wall 82.

The joint portion 62 provided on the damper member 51 and coupled to the bridge portion 55 extends from the second rod 72, and extends coaxially with the second rod 72. In other words, the joint portion 62 is provided in the axial direction of the damper member 51. Since the joint portion 62 is provided in the axial direction of the damper member 51, the weight balance when the damper member 51 is mounted on the vehicle is equalized in the vehicle width direction, so that a laterally equalized feeling of operation is provided during steering.

An operation of the front structure of the saddle type vehicle described above will be described below.

Figure 5A:
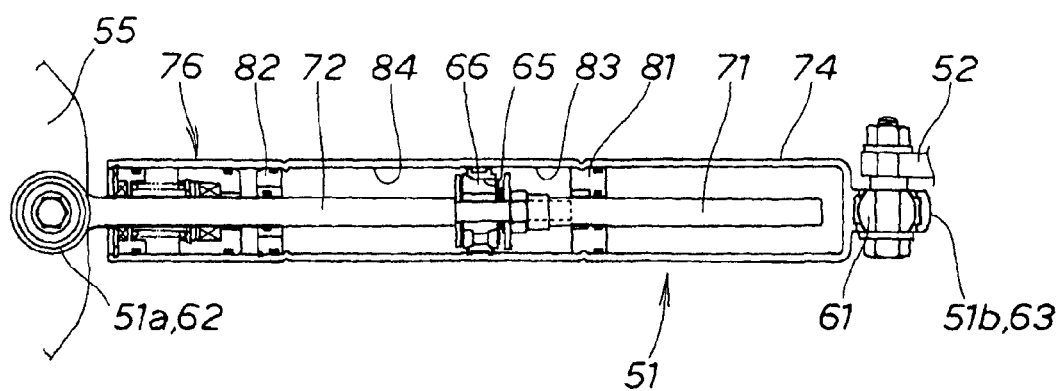
FIG. 5 is a drawing for explaining an operation in conjunction with FIG. 4.

FIG. 5(a) shows a state in which the damper member 51 is contracted.

Figure 5B:
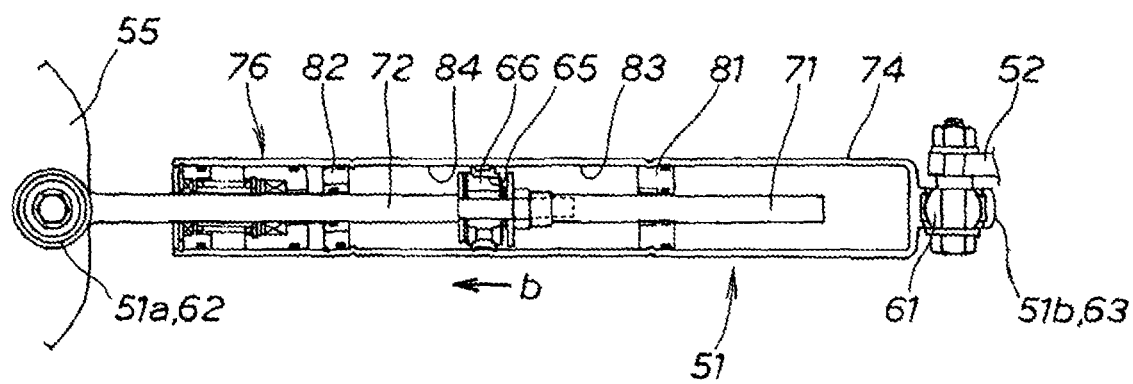
Figure 5C:
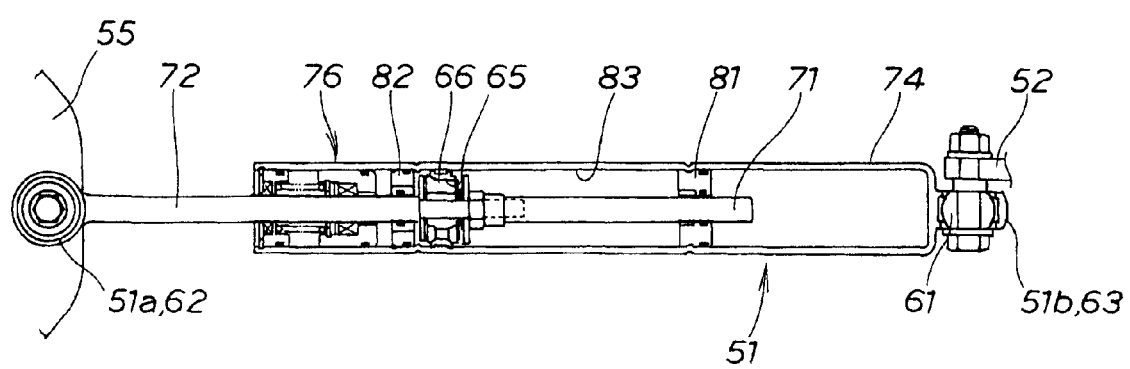

FIG. 5(c) shows a state in which the damper member 51 is expanded.

FIG. 5(b) shows a state of being translated from FIG. 5(a) to FIG. 5(c), in which the piston 66 pulled by the second rod 72 and being integral with the second rod 72 moves in the direction shown by an arrow "b" in the drawing. At this time, oil flows from the second oil chamber 84 to the first oil chamber 83 through the orifices 65 and a resistance of oil passing through the orifices 65 produces a damper effect.

When the damper member 51 is translated from the expanded state to the contracted state, the damper member 51 is pushed by the second rod 72, and the piston 66 integral with the second rod 72 is moved in the direction opposite from the arrow b in FIG. 5(b). At this time, oil flows from the first oil chamber 83 to the second oil chamber 84 through the orifices 65 and a resistance of oil passing through the orifices 65 produces a damper effect.

Figure 6A:
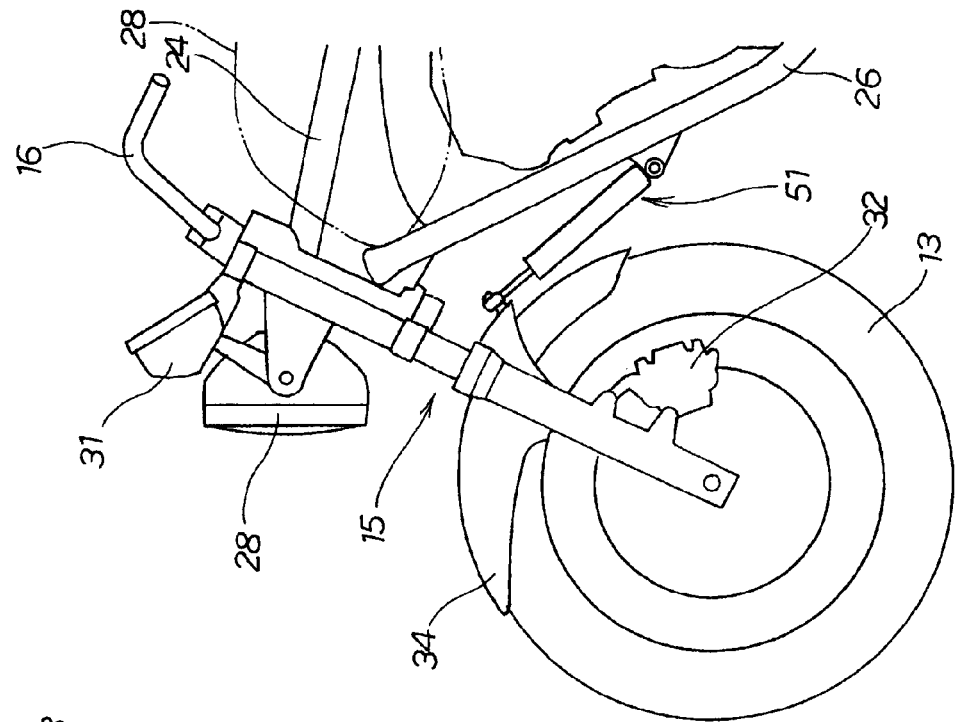
FIG. 6 is a drawing for explaining the operation of a front structure of the automatic two-wheeled vehicle (states in which the fork member is expanded and is contracted)

FIG. 6(a) shows a state in which the damper member 51 is contracted. A center axis F of the fork member and a center axis D of the damper member are orthogonarized in a state in which the fork member 15 is expanded completely. At this time, the rider is not on the vehicle.

The state of the damper member 51 corresponding to FIG. 6(a) is FIG. 5(a), in which the piston 66 is closer to the first partitioning wall 81, and the damper member 51 is in the contracted state.

Referring back to FIG. 1, the description will be continued.

FIG. 1 shows a state in which a rider M is on the vehicle solely, and the joint portion 62 moves in the direction a in the drawing in comparison with a state where the rider M is not on the vehicle. The state of the damper member 51 corresponding to FIG. 1 is supposed to be such that the position of the piston 66 is moved to a position generally between FIG. 5(a) and FIG. 5(b). When the rider M gets on the vehicle, the damper member 51 is moved from FIG. 5(a) to FIG. 5(b).

Figure 6B:
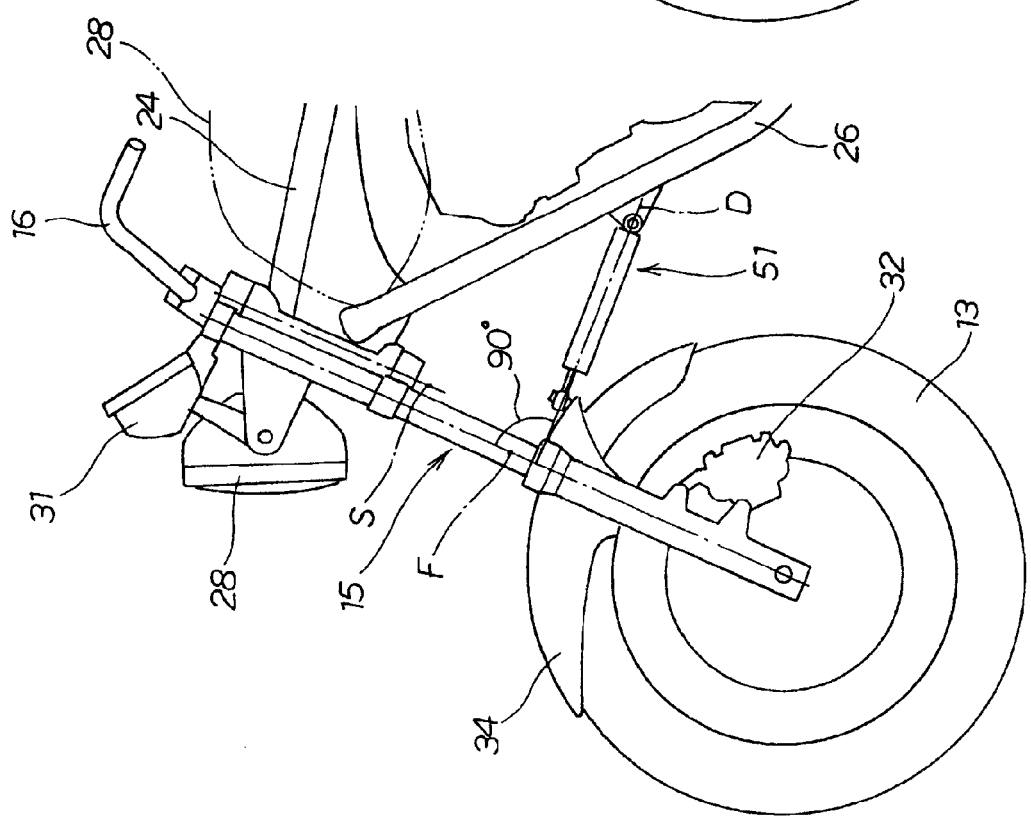

FIG. 6(b) shows a state in which the damper member 51 is expanded to the maximum. At this time, the fork member 15 is in the state of being contracted to the maximum. The state of the damper member 51 corresponding to FIG. 6(b) is FIG. 5(c). For example, when a brake is applied on the front wheel during the travel, the vehicle assumes a completely bent position, so that the piston 66 gets close to the second partitioning wall 82, and the damper member 51 assumes the expanded state.

Referring back to FIG. 6(a), the axis F (center axis F) of the fork member and the axis D of the damper member (center axis D) are arranged so as to be orthogonalized in a state in which the fork member 15 is expanded completely. In this arrangement, the more the fork member 15 is shortened, the higher the damping force of the damper member 51 becomes. Therefore, the damping force around the completely bent position of the vehicle, which produces a high reaction force and hence requires a higher damping force, can be increased. The stroke of the damper member 51 can be utilized effectively over the entire range. In addition, the closer the position of the fork member 15 becomes to the completely bent position of the vehicle, the more the damping force of the damper member 51 increases. Therefore, the stroke of the damper member 51 can be utilized effectively over the entire range.

Figure 7A:
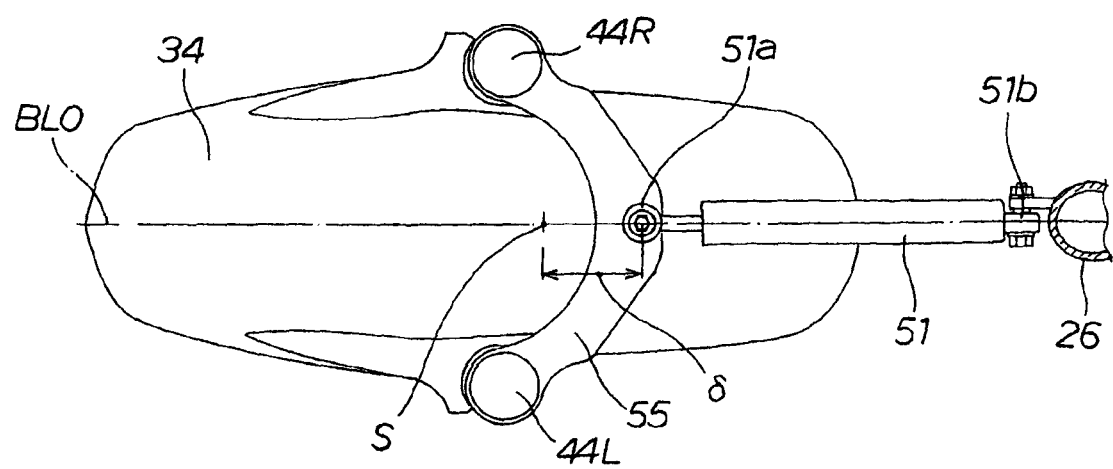
FIG. 7 is a drawing for explaining an operation of the front structure of the automatic two-wheeled vehicle (states in which a front wheel is steered to the right and to the left from the state of traveling straight-ahead)

FIG. 7(a) shows a state in which the steering angle of the fork member 15 is "0". At this time, the damper member 51 is in the contracted state.

Figure 7B:
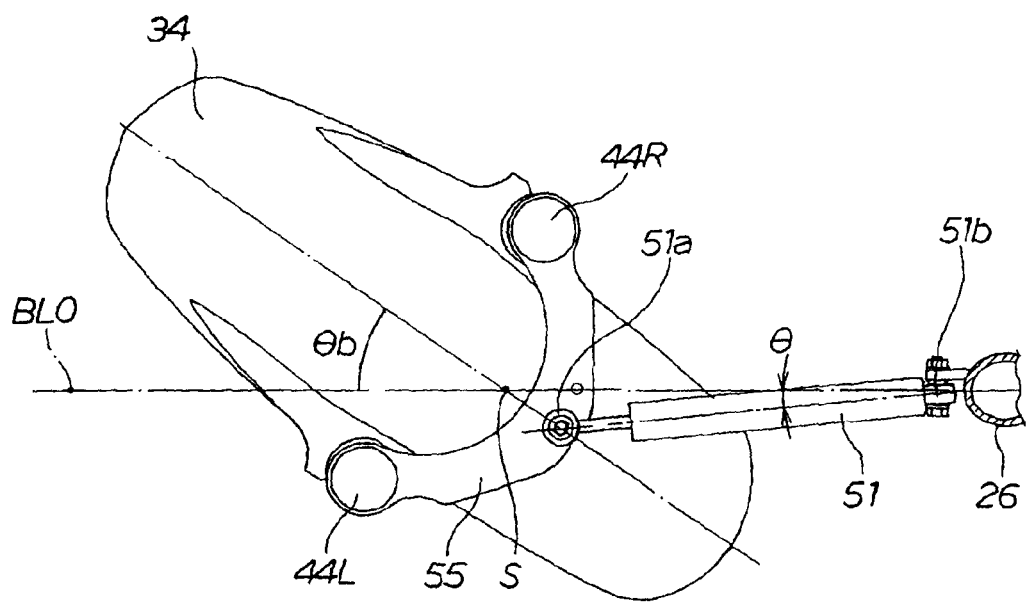

FIG. 7(b) shows a state where the fork member 15 is steered by a steering angle of θb. At this time, the damper member 51 is in the expanded state.

Figure 7C:
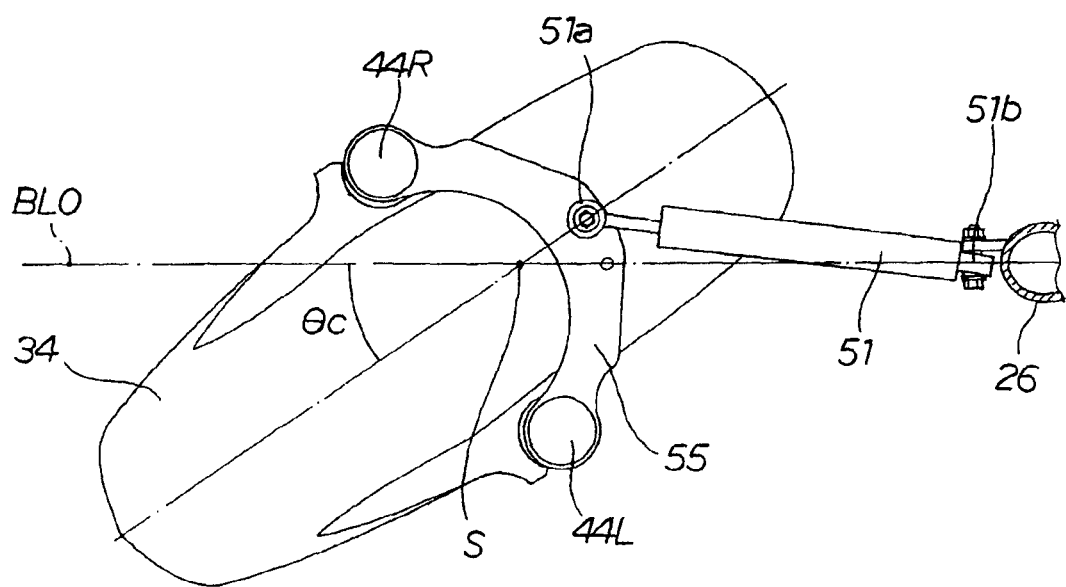

FIG. 7(c) shows a state in which the fork member 15 is steered to the left by a steering angle of θc. At this time, the damper member 51 is in the expanded state.

The front end portion 51a as a front portion of the damper member 51 and the rear end portion 51b as a rear portion thereof are both coupled at a center BL0 in the vehicle width direction.

Assuming that at least one of the front end portion 51a and the rear end portion 51b of the damper member 51 is coupled in a state being offset from the center in the vehicle with direction, the damper properties at the time of steering leftward are different from the damper properties at the time of steering rightward.

Regarding this point, since the front end portion 51a and the rear end portion 51b of the damper member 51 are both coupled at the center position BL0 in the vehicle width direction, the damper properties at the time of steering leftward and the damper properties at the time of steering rightward can be set equally.

In addition, the front end portion 51a of the damper member 51 is coupled at a position offset from the centerline S (center axis S) of the steering stem 42 rearward of the vehicle by a distance δ.

Here, if the front portion of the damper member 51 is set to the same position as the centerline S of the steering stem, a light steering is achieved over the entire range of the steering angle (θ) without affecting a steering damper action.

Since the front end portion 51a of the damper member 51 is coupled at a position offset from the centerline S of the steering stem rearward of the vehicle by the distance (δ), the distance between the vehicle body frame 11 and the front end portion 51a of the damper member 51 can be changed in association with the rotation of the steering stem 42. Therefore, the single damper member 51 can function as a steering damper, in addition to the function of damping vibrations in the fore-and-aft direction and the left-and-right direction of the fork member 15.

Referring back to FIG. 6, the damper member 51 is provided between the bottom pipe 44L, 44R and the vehicle body frame 11.

In the related art, in the structure in which a telescopic fork is employed for supporting the front wheel, preferable damping properties are obtained when a shock is applied to the telescopic fork in the direction of strokes, which is the same as the direction of the axis of the telescopic fork (hereinafter, also referred to simply as "fork member").

However, the fork member receives shocks (impact forces) in directions different from the direction of the axis of the fork member, for example, in the fore-and-aft direction and the left-and-right direction of the fork member in addition to the direction of strokes. In this manner, there remains a room for improvement in riding comfort because only absorption of shocks (impact forces) caused by displacement (bowing) of the fork member is achieved against the forces in the fore-and-aft and left-and-right directions applied to the fork member, and the damping function is not provided.

In addition, since the riding comfort is adjusted using the bowing of the fork member, adjustment of the rigidity of the fork member is required. More specifically, it is measured by changing the thickness of the fork member, changing the pipe diameter, or adding patches. In the above-described countermeasures, there arises a problem of increase in probability of cost or weight increase of the fork member.

In contrast, the damper member 51 is provided between the bottom pipe 44L, 44R and the vehicle body frame 11.

When a force is applied to the telescopic fork 15 in the direction different from the direction of the axis of the telescopic fork 15, the damper member 51 is operated, and hence the vibrations applied in the directions different from the direction of the longitudinal axis, that is, the direction of the strokes of the fork member 15, can be damped.

Since the vibrations applied in the directions different from the direction of the longitudinal axis of the fork member 15 can be damped, the vibrations generated in the telescopic fork 15 are reduced, so that the riding comfort of the vehicle is improved.

More specifically, when a lateral force is applied to the fork member at the time of cornering or climbing over a step on a road surface obliquely, or at the time of braking or the like, the damper member 51 make a stroke slightly to damp the vibrations of the fork member 15, whereby the riding comfort is improved.

In addition, the vibrations can be reduced with a simple structure such as providing the damper member 51 for damping vibrations of the bottom pipe 441, 44R between the bottom pipe 44 and the vehicle body frame 11, or between the member attached to the bottom pipe 44L, 44R and the vehicle body frame 11, so that adjustment of the rigidity of the fork member 15 is facilitated. In addition, since the damper member 51 is configured to be expanded and contracted while rotating with respect to the bottom pipe 44L, 44R at the time of steering, preferable damping forces according to the steering angle can be set.

Subsequently, the properties of the steering damper will be described.

Figure 8:
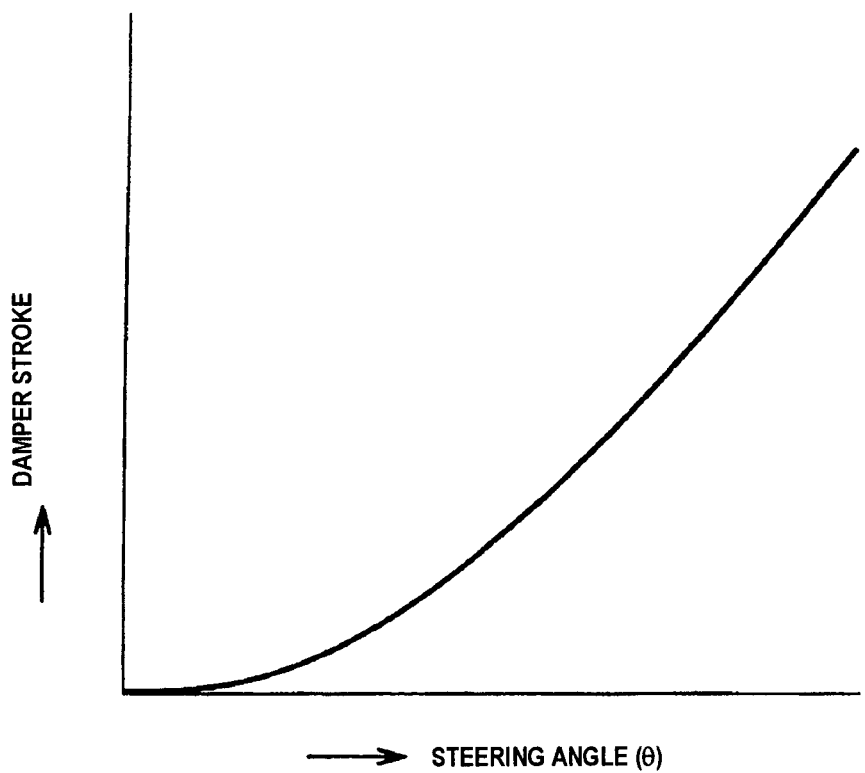
FIG. 8 is a graph for explaining a relationship between a steering angle and a damper stroke.

As shown in FIG. 8, the properties are set in such a manner that the damper stroke per unit angle of the damper member 51 when the steering angle (θ) of the steering handle (FIG. 1, reference numeral 16) is large become larger than the damper stroke per unit angle of the damper member 51 when the steering angle (θ) of the steering handle 16 is small. The damper member (FIG. 7, reference numeral 51) is provided with so-called progressive properties.

When the steering angle (θ) of the steering handle 16 is small, the steering handle 16 can be operated with a weak steering force, and a stronger steering force is required as the steering angle (θ) of the steering handle 16 is increased. In other words, the stroke of the damper member 51 is changed progressively according to the steering properties, so that light steering properties can be provided when the steering angle is small, and stable steering properties can be provided as the steering angle is increased.

Subsequently, a modification of FIG. 2 will be described.

Figure 9:
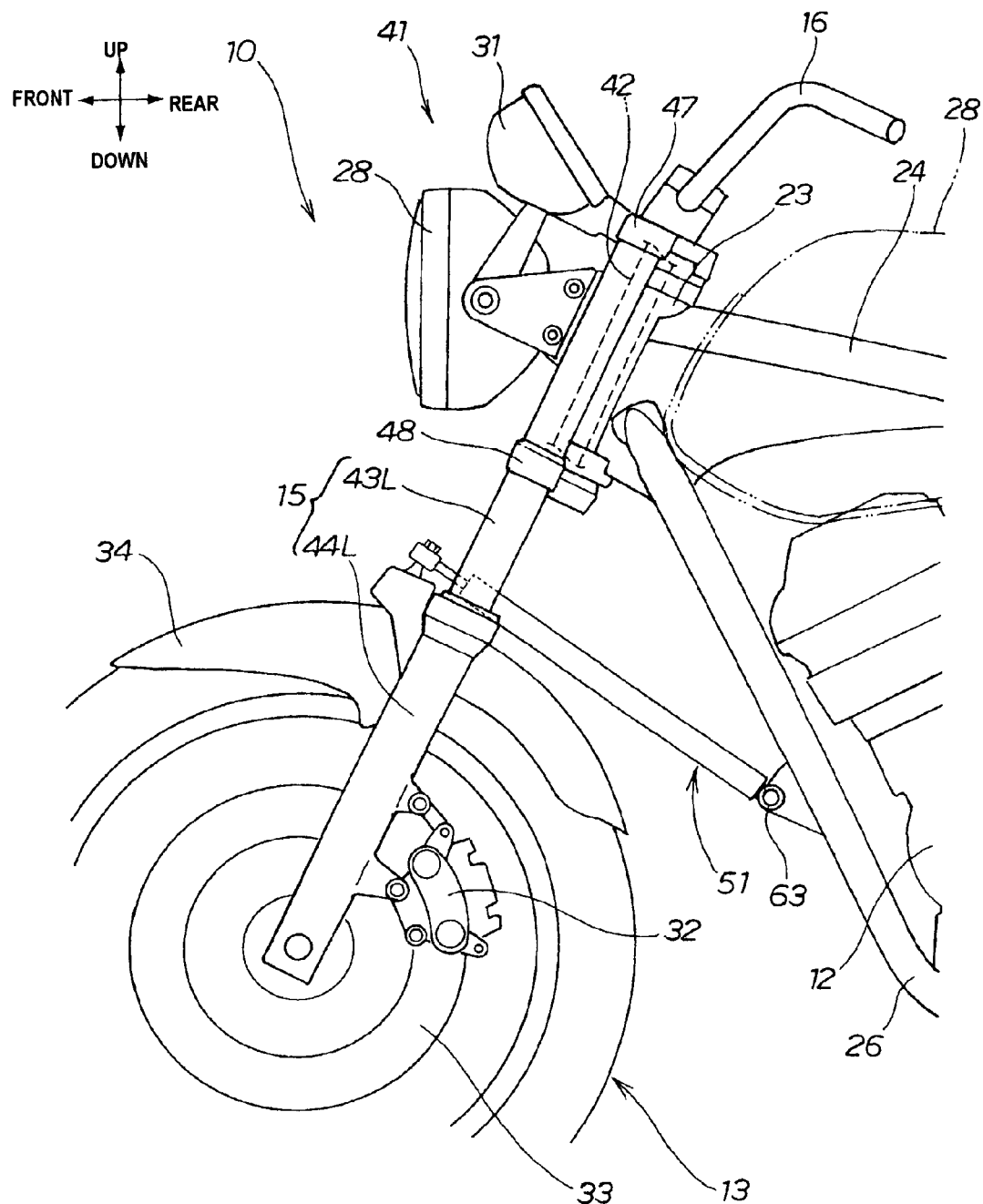
FIG. 9 is a drawing showing a modification of FIG. 2.

As shown in FIG. 9, the front portion 41 of the automatic two-wheeled vehicle includes the steering stem 42 rotatably supported by the head pipe 23 and the fork member 15 coupled to the steering stem 42 and supporting the front wheel 13.

A point different from FIG. 2 resides in that the front portion of the damper member 51 passes through the center in the vehicle width direction, and is coupled to the bridge portion 55 at a position offset from the centerline (S) of the steering stem forward of the vehicle.

Second Embodiment

Referring now to the drawings, a second embodiment will be described.

Figure 10:
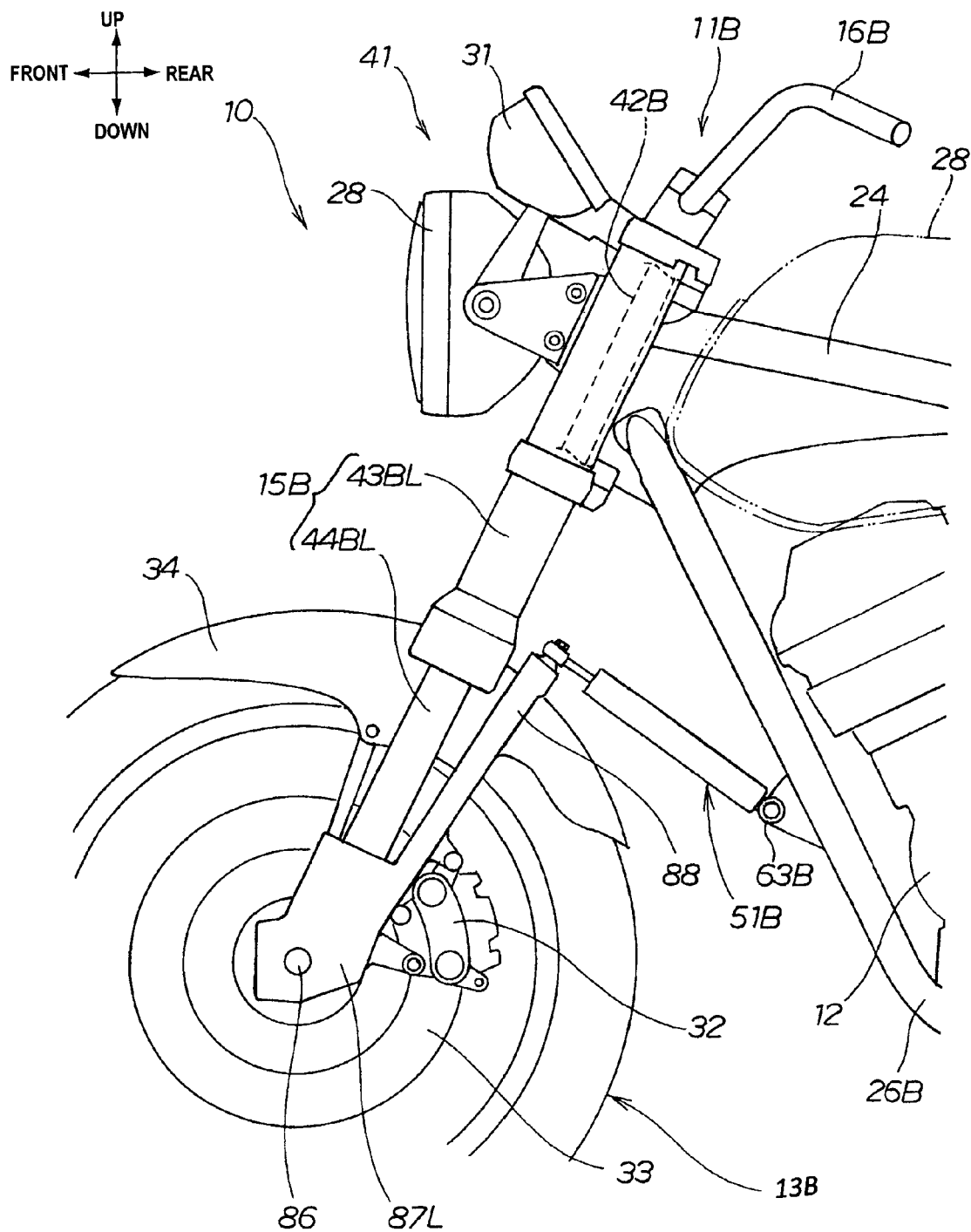
FIG. 10 is a drawing showing another embodiment of FIG. 2.

As shown in FIG. 10, a fork member 15B is provided with a pair of left and right upper pipes 43BL, 43BR coupled to a steering stem 42B (only reference numeral 43BL on the near side of the drawing is shown), and a pair of left and right bottom pipes 44BL, 44BR slidably coupled to the upper pipes 43BL, 43BR and rotatably supporting a front wheel 13B on a lower portion thereof.

Significant different points from FIG. 2 reside in that an inverted front fork in which the upper pipes 43BL, 43BR are outer tubes each having a fork spring arranged therein and a bottom pipe is an inner tube, and in that left and right rear portions of axle holders 87L, 87R (only the reference numeral 87L on the near side of the drawing is shown) that support a front wheel axle 86 are extended upward and then the left and right are bridged in the vehicle width direction by a bridge 88, and a front end portion of a damper member 51B is connected to the bridge 88.

In other words, in addition to the fork member 15B, the damper member 51B configured to damp vibrations of the bottom pipes 44BL, 44BR is provided between the bridge 88 as a member attached to the bottom pipe 44 and a vehicle body frame 11B.

Since the damper member 51B is provided between the bridge 88 and the vehicle body frame 11B, when a force is applied to the telescopic fork 15B (fork member 15B) in the direction different from the direction of an axis of the fork member 15B, the damper member 51B makes a stroke and hence vibrations applied in the directions different from the direction of a longitudinal axis, that is, the direction of the strokes of the fork member 15B, can be alleviated.

Since the vibrations applied in the directions different from the direction of the longitudinal axis of the fork member 15B can be damped, the vibrations generated in the fork member 15B are reduced, so that the riding comfort of the vehicle is improved.

In addition, the vibrations can be reduced with a simple structure such as providing the damper member 51B between the vehicle body frame 11B and the bridge 88, so that adjustment of the rigidity of the fork member 15B is no longer necessary. Since the adjustment of the fork member 15B is not necessary, increase in weight of the fork member 15B can be restrained.

In addition, since the damper member 51B is configured to be expanded and contracted while rotating with respect to the bottom pipes 44BL, 44BR at the time of steering, preferable damping forces according to the steering angle can be set.

Third Embodiment

Referring now to the drawings, a third embodiment will be described.

Figure 11:
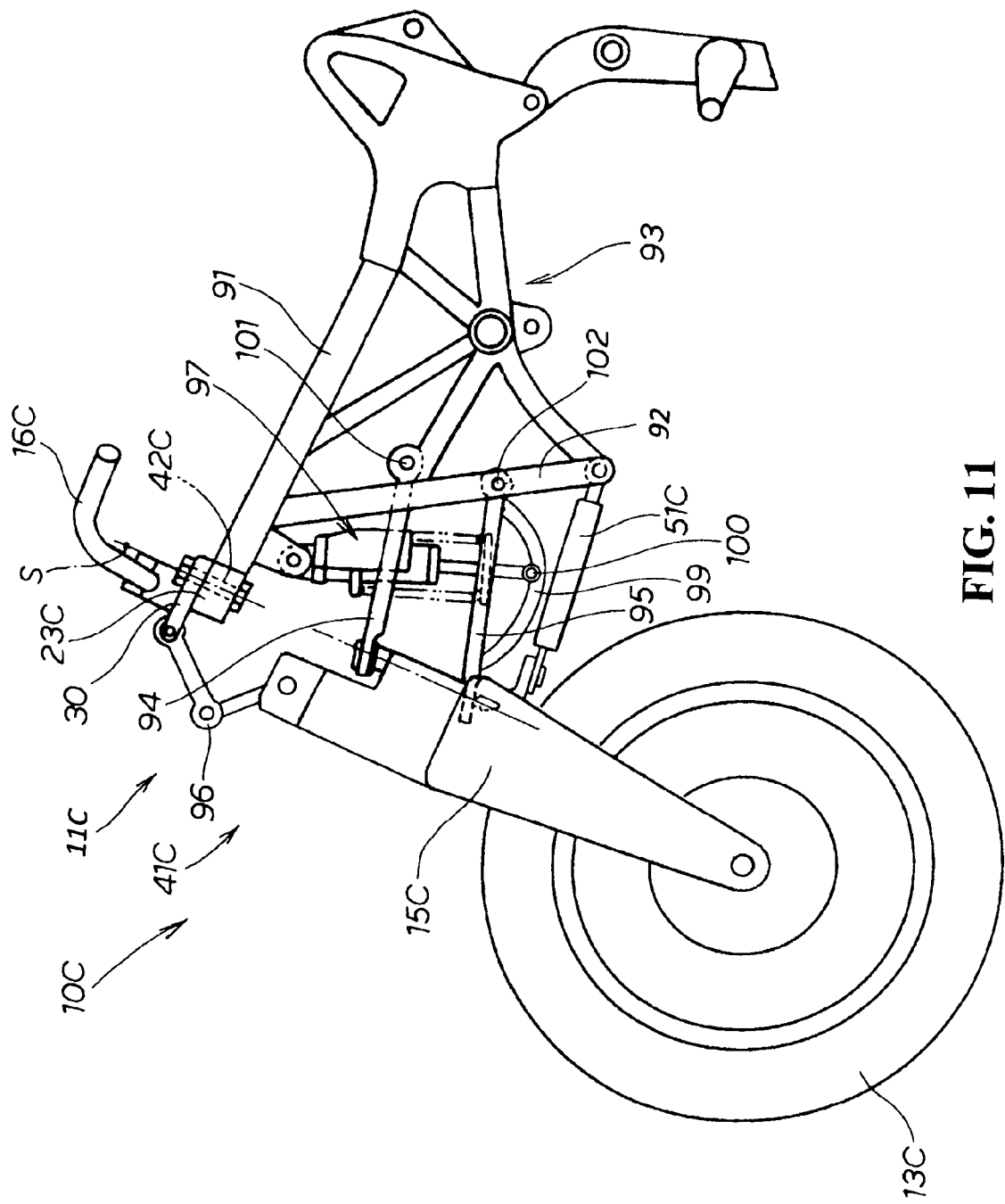
FIG. 11 is a drawing showing still another embodiment of FIG. 2.

As shown in FIG. 11, a front portion 41C of an automatic two-wheeled vehicle 10C includes a head pipe 23C provided at a front portion of a vehicle body frame 11C, a steering stem 42C rotatably supported by the head pipe 23C, and a fork member 15C coupled so as to be capable of relative displacement in the direction of an axis of the steering stem 42C, supporting a front wheel 13C at a lower portion thereof, and coupled so as to be steerable integrally with the steering stem 42C.

The vehicle body frame 11C includes the head pipe 23C, a main frame 91 extending rearward from the head pipe 23C, a down frame 92 extending from a front portion of the main frame 91 obliquely rearward and downward, and a plurality of sub frames 93 connected to rear portions of the main frame 91 and the down frame 92.

An upper arm 94 pivotably extends forward of the vehicle from the front portion of the vehicle body frame 11C via a rotating shaft 101. In the same manner, a lower arm 95 pivotably extends via a rotating shaft 102. The fork member 15C is pivotably and steerably provided at an front end of the upper arm 94 and a front end of the lower arm 95, a link member 96 is elastically connected between an upper portion of the fork member 15C and a steering handle 16C, and a front cushion unit 97 is interposed between the lower arm 95 and the vehicle body frame 11C. A bent pipe 99 assuming an arcuate shape projecting downward, when the vehicle is viewed from the side, bridges a front end portion and a rear end portion of the lower arm, a collar 100 is provided at a midsection of the bent pipe 99, and a lower end portion of the front cushion unit 97 is attached to the collar 100.

Another damper member 51C for damping vibrations of the fork member 15C is provided between the fork member 15C and the vehicle body frame 11C.

With the damper member 51C as described above, the vibrations applied to the fork member 15C in the direction different from the axial direction S of the steering stem can be damped by the damper member 51C. Therefore, the vibrations of the fork member 15C can be restrained.

Other effects and advantages are the same as those in the first embodiment and the second embodiment, and hence description will be omitted.

The present invention is applied to the automatic two-wheeled vehicle in the embodiments. However, it is applicable to a saddle type three-wheeled vehicle (three-wheeled buggy) or a saddle type four-wheeled vehicle (four-wheeled buggy). Therefore, it can be applied to general saddle type vehicle without problem.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. A front structure of a saddle vehicle, comprising:
a head pipe provided on a front portion of a body frame of the vehicle;
a steering stem rotatably supported by said head pipe; and
a fork member coupled to said steering stem and supporting a front wheel, the fork member including a pair of left and right upper pipes coupled to said steering stem and a pair of left and right bottom pipes slidably coupled to said left and right upper pipes and rotatably supporting said front wheel at a lower portion thereof;
a damper member for damping vibrations of said left and right bottom pipes provided between said left and right bottom pipes and said body frame; and
a bridge portion bridging said left and right bottom pipes, wherein a front portion of said damper member is coupled to a center portion of said bridge portion, in a vehicle width direction, and
wherein a rear portion of said damper member is coupled to a center portion of said body frame, in the vehicle width direction.

2. The front structure of the vehicle according to claim 1, wherein said front portion of said damper member passes through a centerline of the vehicle, and
wherein said front portion of said damper is coupled to said bridge portion at a position offset from a centerline of said steering stem, in either a forward or rearward direction of the vehicle.

3. The front structure of the vehicle according to claim 2, wherein a center axis of said fork member and a center axis of said damper member are orthogonalized when said fork member is fully expanded.

4. The front structure of the vehicle according to claim 3, wherein said damper member includes a piston,
a first rod extending from one surface of said piston,
a second rod extending from the other surface of said piston,
a cylinder member housing said first rod, said second rod and said piston, and
a joint portion extending from said cylinder member coaxially with said first rod and said second rod, and coupled to a stay portion.

5. The front structure of the vehicle according to claim 2, wherein said damper member includes
a piston,
a first rod extending from one surface of said piston,
a second rod extending from the other surface of said piston,
a cylinder member housing said first rod, said second rod and said piston, and
a joint portion extending from said cylinder member coaxially with said first rod and said second rod, and coupled to a stay portion.

6. The front structure of the vehicle according to claim 1, wherein a center axis of said fork member and a center axis of said damper member are orthogonalized when said fork member is fully expanded.

7. The front structure of the vehicle according to claim 6, wherein said damper member includes
a piston,
a first rod extending from one surface of said piston,
a second rod extending from the other surface of said piston,
a cylinder member housing said first rod, said second rod and said piston, and
a joint portion extending from said cylinder member coaxially with said first rod and said second rod, and coupled to a stay portion.

8. The front structure of the vehicle according to claim 1, wherein said damper member includes
a piston,
a first rod extending from one surface of said piston,
a second rod extending from the other surface of said piston,
a cylinder member housing said first rod, said second rod and said piston, and
a joint portion extending from said cylinder member coaxially with said first rod and said second rod, and coupled to a stay portion.

* * * * *